(12) United States Patent
Stocker (10) Patent No.: US 9,752,627 B2
(45) Date of Patent: Sep. 5, 2017

(54) ELECTROMAGNETICALLY ACTUABLE CLUTCH ARRANGEMENT

(71) Applicant: Magna Powertrain AG & Co KG, Lannach (AT)

(72) Inventor: Martin Stocker, Graz (AT)

(73) Assignee: MAGNA POWERTRAIN AG & CO KG, Lannach (AT)

( * ) Notice: Subject to any disclaimer, the term of this patent is extended or adjusted under 35 U.S.C. 154(b) by 224 days.

(21) Appl. No.: 14/690,732

(22) Filed: Apr. 20, 2015

(65) Prior Publication Data
US 2015/0308518 A1    Oct. 29, 2015

(30) Foreign Application Priority Data

Apr. 25, 2014   (DE) .................... 10 2014 207 804

(51) Int. Cl.
| | |
|---|---|
| *F16D 27/09* | (2006.01) |
| *F16D 27/02* | (2006.01) |
| *F16D 27/118* | (2006.01) |
| *F16D 11/16* | (2006.01) |
| *F16D 27/14* | (2006.01) |
| *F16H 63/30* | (2006.01) |

(52) U.S. Cl.
CPC ............. *F16D 27/02* (2013.01); *F16D 11/16* (2013.01); *F16D 27/118* (2013.01); *F16D 27/14* (2013.01); *F16H 63/304* (2013.01); *F16H 2063/305* (2013.01)

(58) Field of Classification Search
CPC ... F16D 27/09; F16D 27/118; F16D 2063/305

USPC ..................................................... 192/69.62
See application file for complete search history.

(56) References Cited

U.S. PATENT DOCUMENTS

| | | | |
|---|---|---|---|
| 796,205 A * | 8/1905 | Mitchell | ................. F16D 11/14 |
| | | | 192/69.62 |
| 1,257,718 A * | 2/1918 | Lott | ........................ F16D 43/18 |
| | | | 192/48.5 |
| 2,803,323 A * | 8/1957 | Newell | ................... F16D 11/10 |
| | | | 192/18 R |
| 3,157,259 A | 11/1964 | Bialek | |
| 3,327,823 A | 6/1967 | Miller | |

(Continued)

FOREIGN PATENT DOCUMENTS

| | | |
|---|---|---|
| DE | 2055681 A1 | 5/1972 |
| DE | 102004013450 A1 | 9/2005 |

(Continued)

*Primary Examiner* — Stacey Fluhart
(74) *Attorney, Agent, or Firm* — Dickinson Wright PLLC (57) ABSTRACT

The present invention relates to a clutch arrangement for coupling a first clutch section to a second clutch section. The clutch arrangement has at least one pin-shaped shift element mounted so as to be movable in the direction of the longitudinal axis thereof by the first clutch section between an engaged position, in which the two clutch sections are coupled for conjoint rotation by means of the shift element, and a disengaged position, in which the two clutch sections are decoupled from one another. Also provided is a spring, which acts at least indirectly on the shift element and preloads the latter in the direction of the engaged or disengaged position, whereas an electromagnet serves to move the shift element counter to the preloading effect of the spring in the energized state.

16 Claims, 4 Drawing Sheets

(56) References Cited

U.S. PATENT DOCUMENTS

| | | | |
|---|---|---|---|
| 4,534,455 A | 8/1985 | Fujikawa | |
| 4,618,046 A * | 10/1986 | Sassen | B61C 9/52 |
| | | | 192/108 |
| 4,744,449 A | 5/1988 | Sekella et al. | |
| 5,052,534 A | 10/1991 | Gustin et al. | |
| 7,717,437 B2 * | 5/2010 | Adams, III | B60G 21/0556 |
| | | | 192/53.5 |
| 7,966,854 B2 * | 6/2011 | Imedio Ocana | E05B 47/0642 |
| | | | 192/69.62 |
| 8,267,237 B2 | 9/2012 | Winkler et al. | |
| 2005/0258013 A1 * | 11/2005 | Stevenson | F16D 23/00 |
| | | | 192/35 |
| 2013/0220765 A1 | 8/2013 | Faust | |
| 2014/0190781 A1 | 7/2014 | Lawson et al. | |

FOREIGN PATENT DOCUMENTS

| | | |
|---|---|---|
| DE | 102006061782 A1 | 7/2007 |
| FR | 2973459 A1 | 10/2012 |
| GB | 884233 | 12/1961 |

\* cited by examiner

ELECTROMAGNETICALLY ACTUABLE CLUTCH ARRANGEMENT

CROSS-REFERENCE TO RELATED APPLICATIONS

This application claims the benefit and priority of German Application No. 102014207804.0 filed Apr. 25, 2014. The entire disclosure of the above application is incorporated herein by reference.

TECHNICAL FIELD

The present invention relates to an electromagnetically actuable clutch arrangement, which can be used, in particular, in a drive train of a motor vehicle in order to be able to couple a first clutch section, e.g. a first shaft section or a main shaft, to a second clutch section, e.g. a second shaft section or a hub.

BACKGROUND

This section provides background information that is not necessarily prior art.

Upon actuation of the clutch arrangement, for example, a positive connection can be produced between a rotating shaft, on the one hand, and an input shaft, an output shaft, a housing or a crown gear of a differential, or a gearwheel of a bevel gear, on the other hand. Devices of this kind can be used in the form of "disconnect systems" for decoupling parts of a drive train in a motor vehicle with selectable all-wheel drive, for example, thus allowing the connection between the primary axle or the drive unit, on the one hand, and the secondary axle, on the other hand, to be at least partially deactivated or interrupted in the case of two-wheel drive. In general, torque transmission can take place from the rotating shaft as the input element to said drive element as the output element or vice versa.

Where the directional terms "axial" and "radial" are used here in context, they refer to the axis of rotation of two clutch sections to be coupled, unless the circumstances of the individual case show it to be otherwise.

As compared with a hydraulic or pneumatic actuator, an electromagnet for actuating the clutch arrangement allows a particularly simple and low-cost construction. To intensify the magnetic force, the field coil of the solenoid can be formed around a yoke or a core consisting of a magnetizable material. There is generally an air gap between the armature and the field coil or a front stop surface of the yoke, the gap determining the maximum adjustment stroke.

SUMMARY

This section provides a general summary of the disclosure and is not intended to be considered a comprehensive disclosure of its full scope or all of its features, objectives and advantages.

It is an underlying object of the present disclosure to provide an electromagnetically actuable clutch arrangement, for which the installation space requirement is as small as possible, which can be produced at low cost, and which is as light as possible.

The clutch arrangement in accordance with the present disclosure can be used to couple a first clutch section to a second clutch section, this being accomplished using at least one pin-shaped shift element in the form of a metallic cylindrical bar, pin or roller, which is mounted so as to be movable in the direction of the longitudinal axis thereof by the first clutch section between an engaged position, in which the two clutch sections are coupled for conjoint rotation by means of the shift element, and a disengaged position, in which the two clutch sections are decoupled from one another. In order to be able to transfer the at least one shift element from its disengaged position to its engaged position, the clutch arrangement furthermore has a spring, which acts at least indirectly on the shift element in order to preload the latter in the direction of the engaged position thereof. As an alternative, the spring can preload the shift element in the direction of the disengaged position thereof, allowing said element to be transferred from the engaged position thereof to the disengaged position thereof through the action of the spring. Moreover, the clutch arrangement has an electromagnet, which displaces or moves the shift element counter to the preloading effect of the spring in the energized state.

Although, in accordance with the above, the clutch arrangement has at least one pin-shaped shift element, there is preferably a plurality of shift elements, which are arranged in a uniformly spaced manner around the first clutch section, especially if the clutch sections are shaft sections, in order in this way to ensure uniform power or torque transmission between the two clutch sections. The shift elements can also be arranged in uniformly spaced groups around the first clutch section, which means that individual groups of shift elements, e.g. two, three or four shift elements in each case, are arranged in a regular relationship with one another around the first clutch section.

Since the electromagnet acts directly on the at least one shift element by means of its magnetic field in the energized state in order to move said shift element counter to the preloading effect of the spring, the mass of the moving parts in the clutch arrangement is reduced, as a result of which lower shifting forces have to be produced by the electromagnet, leading in turn to the possibility of making the electromagnet weaker and therefore smaller. Moreover, the clutch arrangement is less sluggish in response by virtue of the low mass of the parts to be moved, as a result of which the clutch arrangement can be shifted rapidly, even with a relatively weak electromagnet. However, the electromagnet can also exert a magnetic attraction on the shift element indirectly via a shifting device which will be explained in greater detail below in order to move said element counter to the preloading effect of the spring.

Preferred embodiments of the invention will now be explored below. Further embodiments can be derived from the dependent claims, the description of the figures and the drawings.

Thus, in accordance with one embodiment, it is envisaged that an axially movable shifting device, which can be an axially movable shifting disc for example, which carries a plurality of shift elements extending axially from said device, is arranged on the first clutch section, wherein the spring acts either indirectly on the shift elements via the shifting device or directly on the shift elements in order to preload said elements in the direction of the engaged or disengaged position thereof. In contrast to such an axial shift element arrangement, however, a radial shift element arrangement, in which the shift elements are spring-preloaded in a radial direction, is likewise possible. However, coupling the shift elements to one another via an axially movable shifting device entails the advantage that synchronous shifting operation, in which all the shift elements can be shifted at the same time, can be ensured in a relatively simple way by this means.

In accordance with a preferred embodiment, the shift elements are fastened on the shifting device with play perpendicularly to the longitudinal axis of said elements. This can be accomplished, for example, by each of the pin-shaped shift elements having a flange, by which the shift element is surrounded in the manner of a collar at one of the ends thereof, wherein the respective flange is received by a respective stepped bore, which is formed in the shifting device and from which the shift element extends through the shifting device in the direction of the free end of said shift element, wherein the flange of the respective shift element is preferably received with play by the respective stepped bore. Thus, the stepped bore has a widened hole section which receives the flange of the respective shift element with play, thus allowing at least the free or distal end of the respective shift element to move freely within certain limits in a radial direction at the opposite end of the shift element from the flange. Owing to the fastening of the shift elements on the shifting device with play, tilting or jamming of the shift elements can be prevented here.

In the case of the embodiment explained above, in which the flanges of the individual shift elements are received with play by stepped bores formed in the shifting device and in which the shift elements are preloaded by the spring in the direction of the engaged position thereof, it is envisaged according to another embodiment that the spring acts directly on the flanges of the shift elements in order to preload them in the direction of the engaged position thereof. The spring force acting directly on the shift elements is thus distributed uniformly to the respective other shift elements by the shifting device, which is designed as a shifting disc for example, thereby making it possible to ensure simultaneous or synchronous actuation of all the shift elements. Moreover, the magnetic field of the electromagnet acts not only on the shift elements but also on the shifting device in this case, thereby making it possible to transfer all the shift elements simultaneously into the disengaged position thereof as a result of energization of the electromagnet.

In accordance with another embodiment, it is envisaged that the clutch arrangement furthermore has an impulse element, which is movable both relative to the shifting device and relative to the electromagnet and is preloaded in a direction away from the electromagnet by means of at least one further spring, which is supported on the shifting device and the preloading effect of which is less than the preloading effect of the spring which acts on the shift elements. For example, the shifting disc can carry an axially movable impulse element of this kind, which is preloaded in the same axial direction as the shift elements by means of at least one spring supported on the shifting disc, wherein the stiffness of this at least one spring is less in total than the stiffness of the spring which acts on the shift elements. By means of the impulse element, it is possible here to ensure that the clutch arrangement can be shifted even under load and, in particular, under a higher residual torque than without such an impulse element, without the need for the electromagnet to be given larger dimensions to achieve this, as will be explained in greater detail with reference to the figures.

The impulse element can, for example, be a ring element, preferably of substantially C- or U-shaped cross section, which surrounds or fits around the outer circumference of the shifting disc in such a way that the flanges of the "C" or of the "U" flank the shifting disc on both sides along the edge thereof. However, the U-shaped form had a more functional character, in the sense of forming two stops, within which the U-shaped element can move. As an alternative, the impulse element can also be a stepped tube with a retaining ring.

In the case where the two clutch sections are shaft sections, the first clutch section can have a first shaft flange, for example, and the second clutch section can have a second shaft flange, which lies opposite the first shaft flange with a spacing in an axial direction. In this case, the first shaft flange has a first multiplicity of through-holes, in each of which a shift element is mounted in an axially movable manner, irrespective of its position, and the second shaft flange has a second multiplicity of pockets, into which the shift elements engage positively in the engaged position thereof in such a way that the two shaft sections are coupled to one another for conjoint rotation. In this case, the through-holes and pockets are spaced apart uniformly in the circumferential direction, with the result that, in the case where the number of pockets is two or three times the number of through-holes for example, there are just as many rotational positions available for the engagement of a clutch arrangement having twelve shift elements, for example, as with a clutch arrangement having 24 teeth, thus allowing the clutch to be shifted substantially without any delay.

In accordance with the above statements, the two shaft sections can each have a shaft flange, which can be connected positively to one another by means of the shift elements to couple the two shaft sections. In accordance with a preferred embodiment, the first shaft flange continues in an annular section in the direction of the second shaft flange, wherein the pockets in the second shaft flange are designed as substantially semicircular recesses in the outer circumferential edge of the second shaft flange. In contrast, the through-holes in the first shaft flange continue as substantially semicircular recesses in the inner circumferential edge of the annular section of the first shaft flange in order to create substantially circular pockets for the shift elements together with the semicircular recesses in the outer circumferential edge of the second shaft flange.

However, it is likewise possible, in accordance with another embodiment, that the first shaft flange continues in a cylindrical section in the direction of the second shaft flange, wherein the pockets in the second shaft flange are designed as substantially semicircular recesses in the inner circumferential edge of the second shaft flange in this case. In contrast, the through-holes in the first shaft flange continue as substantially semicircular recesses in the outer circumferential edge of the cylindrical section of the first shaft flange in order to create substantially circular pockets for the shift elements together with the semicircular recesses in the inner circumferential edge of the second shaft flange.

These embodiments, in which in each case a substantially circular pocket for a shift element is created in each case by two semicircular recesses, prove advantageous especially inasmuch as, in this case, the shift elements are subjected only partially to shear since the torques to be transmitted are largely transmitted by means of compressive stresses in both the radial and in the circumferential direction between the semicircular recesses in the annular or cylindrical section of the first clutch section and of the second clutch section. The shift elements can thus be given smaller dimensions, thereby making possible a further reduction in the installation space requirement and the inertia of the clutch arrangement.

Further areas of applicability will become apparent from the description provided herein. The description and specific examples listed in this summary are intended for purposes of illustration only and are not intended to limit the scope of the present disclosure.

DRAWINGS

The invention is now described below purely by way of example with reference to the drawings, in which.

DESCRIPTION

Example embodiments of clutch arrangements are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The clutch arrangements illustrated in the drawings can be employed at various points within a drive train of a motor vehicle in order selectively to couple two components of the drive train. In particular, the clutch arrangement can form a longitudinal or transverse disconnect system in a motor vehicle with manually or automatically selectable all-wheel drive.

In principle, it is also conceivable to decouple an internal combustion engine from the primary drive train by means of the clutch arrangement in order to reduce losses caused by continued rotation of drive train components, such as a manual or automatic transmission, when the vehicle is moving or when drive is being provided by an electric motor on the secondary axle. The clutch arrangement can likewise be used in a hybrid vehicle with driving by an electric motor on the secondary axle in order to decouple the electric motor from the drive train when said motor is not required or there is a need to prevent excessive speed.

Figure 1:
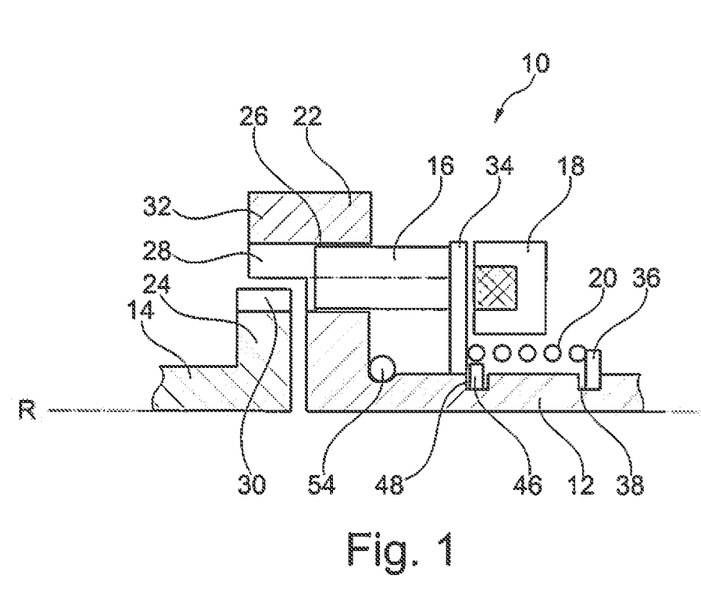
FIG. 1 illustrates a sectional view taken generally through a clutch arrangement constructed in accordance with the teachings of the present disclosure and in accordance with one embodiment.

The clutch arrangement illustrated in FIG. 1 is of rotationally symmetrical design with respect to an axis of rotation R and is used selectively to couple a first clutch member or section in the form of a first shaft section 12 to a second clutch member or section in the form of a second shaft section 14. The first shaft section 12 can be coupled to a front axle differential of a motor vehicle, for example, whereas the second shaft section 14 can be coupled to a rear axle differential of the motor vehicle. When the two shaft sections 12, 14 are connected positively to one another using the shift elements 16, as explained below, the clutch arrangement 10 is engaged or closed and torque transmission can take place from the first shaft section 12 to the second shaft section 14. If, on the other hand, the two shaft sections 12, 14 are not connected positively to one another by means of the shift elements 16, the clutch arrangement 10 is open and the two shaft sections 12, 14 can rotate independently of one another. The opening and closing of the clutch arrangement 10 is accomplished by moving the pin-shaped shift elements 16 in an axial direction along the axis of rotation R, for which purpose an annular electromagnet 18 surrounding the first shaft section 12, on the one hand, and a compression spring 20 surrounding the first shaft section 12, on the other hand, are provided.

As can be seen from FIG. 1, the first shaft section 12 has a first shaft flange 22 on the end thereof adjacent to the second shaft section 14. The second shaft section 14 likewise has a second shaft flange 24 on the end adjacent to the first shaft section 12, the second shaft flange 24 lying opposite the first shaft flange 22 with a spacing in the axial direction. In this case, the first shaft flange 22 has a first multiplicity of through-holes 26, in each of which a shift element 16 is arranged and supported so as to be movable in an axial direction. In contrast, the second shaft flange 24 has a second multiplicity of pockets in the form of substantially semicircular recesses 30, into which the shift elements 16 can be engaged in an axial direction in order to couple the two shaft sections 12, 14 to one another for conjoint rotation.

Figure 2:
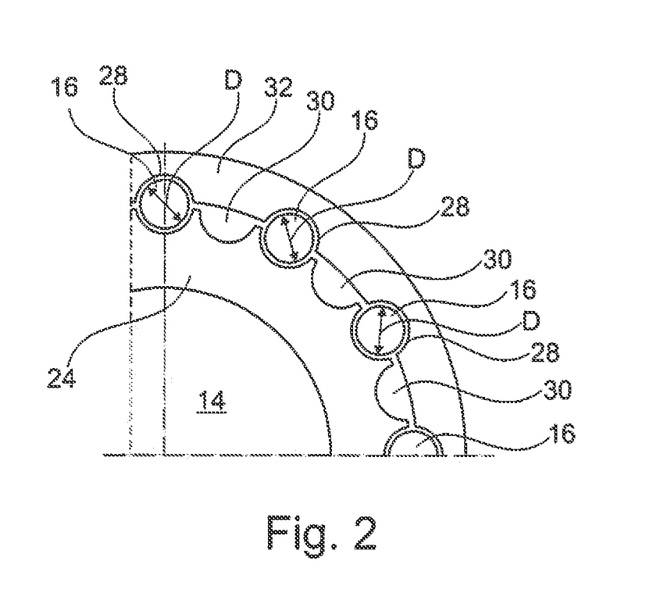
FIG. 2 is a view of a segmental detail of the clutch arrangement in FIG. 1.

As can be seen especially from FIG. 2, the semicircular recesses 30 are formed along the outer circumferential edge of the second shaft flange 24 in a manner uniformly spaced apart, wherein likewise substantially semicircular recesses 30 are arranged in a manner uniformly spaced apart along the inner circumferential edge of an annular section 32, in which the first shall flange 22 is continued in the direction of the second shaft flange 24, in order to create substantially circular pockets for the shift elements 16 together with the semicircular recesses 32 in the second shaft flange 24. In contrast to a design in which the two shaft flanges 22, 24 are formed with circular through-holes to receive the shift elements, the shift elements 16 are thus subjected to an insignificant extent to shear but much more so to transverse pressure, as is made clear by the double arrow "D" in FIG. 2. Thus a multidimensional state of stress prevails in the shift elements 16, owing to which the shift elements 16 can be made less massive than in the case of pure shear loading.

As can furthermore be seen from FIG. 2, there are twice as many semicircular recesses 30 in the second shaft flange 24 as in the annular section 32 of the first shaft flange 22. There are therefore just as many rotational positions available for the engagement of a clutch arrangement 10 having twelve shift elements 16, for example, as with a claw clutch arrangement having 24 teeth, thus allowing the clutch to be shifted in a manner which is substantially independent of position and therefore substantially without any delay.

Before the actuation of the clutch arrangement 10 in accordance with the invention is explained below, it should be noted that, in accordance with the embodiment illustrated in FIG. 3, the first shaft flange 22 can also continue in a cylindrical section 33 which, unlike the annular section 32, is not formed on the outer circumference of the first shaft flange 12 but adjacent to the first shaft section 12 on the first shaft flange 22. In this case, the recesses 30 in the second shaft flange 24 are designed as substantially semicircular recesses 30 in the inner circumferential edge of the second shaft flange 24, whereas the through-holes 26 in the first shaft flange 22 continue as substantially semicircular recesses 28 in the outer circumferential edge of the cylindrical section 33 in order to create circular pockets for the shift elements 16 together with the semicircular recesses 30 in the inner circumferential edge of the second shaft flange 24. This embodiment makes it possible to design the second shaft section 14 as a hollow shaft in which the first shaft section 12 can continue.

Figure 3:
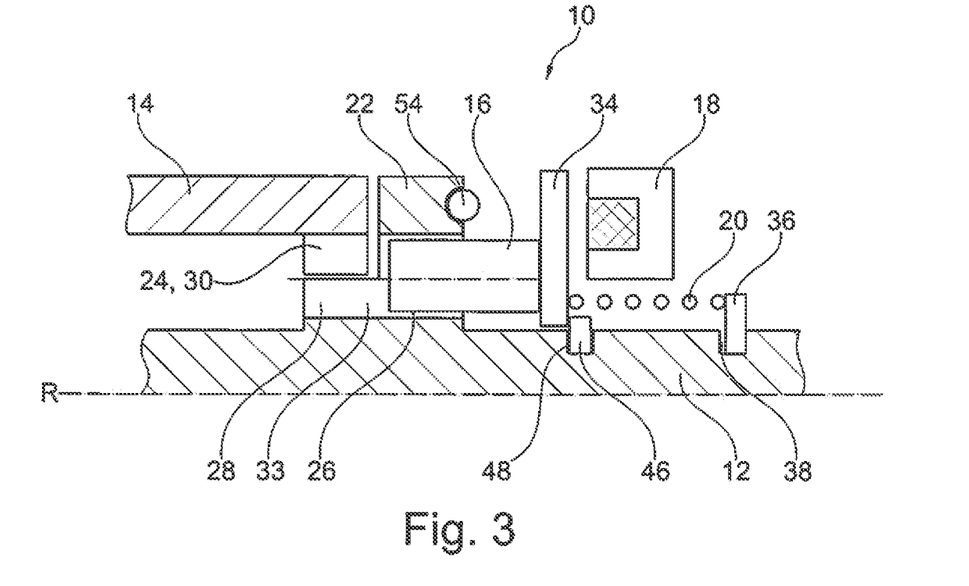
FIG. 3 is a sectional view taken generally through a clutch arrangement constructed in accordance with the teachings of the present disclosure and in accordance with another embodiment.

The actuation mechanisms of the clutch arrangement 10 in accordance with the invention will now be explained below with reference to FIG. 1, these statements being applicable in an analogous fashion to the embodiment of a clutch arrangement 10 in accordance with the invention which is illustrated in FIG. 3.

In the embodiment illustrated in FIG. 1, the shift elements 16 are in the disengaged position thereof in the state illustrated and are preloaded in the direction of the engaged position thereof, in which the shift elements 16 are in engagement with the semicircular recesses 28, 30, by the compression spring 20, which surrounds the first shaft section 12 and acts indirectly on the shift elements 16 via a shifting device in the form of a shifting disc 34 surrounding the first shaft section 12. In this case, the spring 20 is supported in an axial direction on a retaining ring 36, which is arranged in a first annular groove 38 formed in the first shaft section 12. In the state shown in FIG. 1, the shift elements 16 are in the disengaged position thereof, into which they have been transferred by energization of the electromagnet 18. In the energized state, the electromagnet 18 namely produces a magnetic field, which acts directly on the shift elements 16, as a result of which said shift elements are pulled in the direction of the magnet 18. This is therefore a "normally closed" clutch arrangement since, in the de-energized state of the electromagnet 18, the shift elements 16 are pushed into the engaged position thereof by the spring 20. To ensure that the shifting disc 34 does not strike against the first shaft flange 22 directly during this process, which may cause unwanted shifting noises, a damping element 54 in the form of an O-ring, for example, is arranged in the fillet between the first shaft flange 22 and the first shaft section 12, said damping element damping the impact of the shifting disc 34.

Another advantage of the clutch arrangement in accordance with the invention is that said clutch arrangement can be fitted with different numbers of shift elements 16 in order to implement different torque classes. It is possible to transmit torques of about 1800 Nm with the clutch arrangement according to the invention, for example, if a shift element 16 is arranged only in every second through-hole 26 and therefore the clutch arrangement has a total of six shift elements 16; if, on the other hand, the clutch arrangement 10 is fitted with eight shift elements 16, with each third through-hole 26 remaining free, up to about 2300 Nm can be transmitted, whereas, in the case of nine shift elements 16, it is possible to transmit as much as 2600 Nm, in which case each fourth through-hole 26 remains unoccupied. If, on the other hand, each through-hole 26 is fitted with a shift element 16, torques of up to about 3500 Nm can be transmitted. In order to be able to implement different torque classes, all that is required is therefore to change the shift elements 16 present without the need to perform any further adaptation measures.

Figure 4:
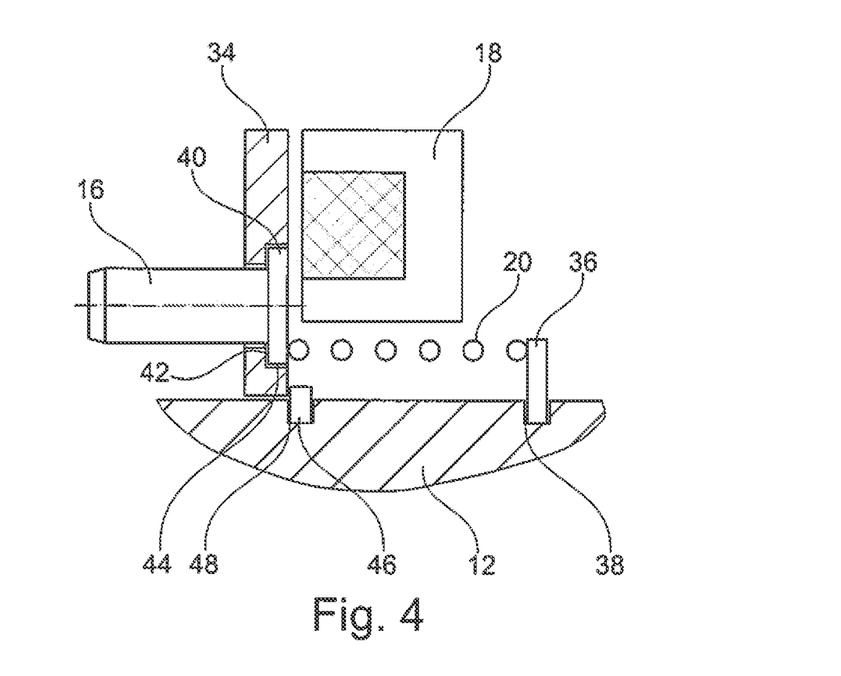
FIG. 4 is a section intended to illustrate one way of fastening the shift elements on a shifting disc for the embodiments illustrated in FIGS. 1 and 3.

In order to prevent jamming or tilting of the shift elements 16 during the engagement of the shift elements 16, the shift elements 16 can be fastened on the shifting disc 34 with play perpendicularly to their longitudinal axis, as in the embodiment illustrated in FIG. 4. For this purpose, each of the pin-shaped shift elements 16 in the embodiment illustrated has a flange 40, which is received by a widened section 44 of the stepped bore 42, which is formed in the shifting disc 34 and from which the respective shift element 16 extends through the shifting disc 34 in the direction of the free end of said shift element. In this case, the diameter of the stepped bore 42 is made somewhat larger than the respective shift element 16, allowing the latter to move slightly in a radial direction in the stepped bore 42 to enable it to be aligned precisely with the respective recesses 30 in the second shaft flange 24 during the engagement process. In addition, the shift elements 16 can be designed in such a way that they have a sphericity at the front free end thereof or taper in the direction of the free end thereof, allowing the shift elements 16 to align themselves automatically when they are introduced into the semicircular recesses 30 in the second shaft flange 24 in the course of the engagement process.

As can furthermore be seen from FIG. 4, the spring 20 acts directly on the flanges 40 of the shift elements 16 in this embodiment, and also on the shifting disc 34, in order to preload them in the direction of the engaged position thereof. During opening, the shift elements 16 take the shifting disc 34 along by means of their flanges 40, the shifting disc, for its part, acting as a magnet armature and transferring the shift elements 16 from the engaged position thereof to the disengaged position thereof in the energized state of the electromagnet 18, in which position the shifting disc 34 comes into contact with a second retaining ring 46, which is arranged in a second annular groove 48 in the first shaft section 12.

Figure 5A:
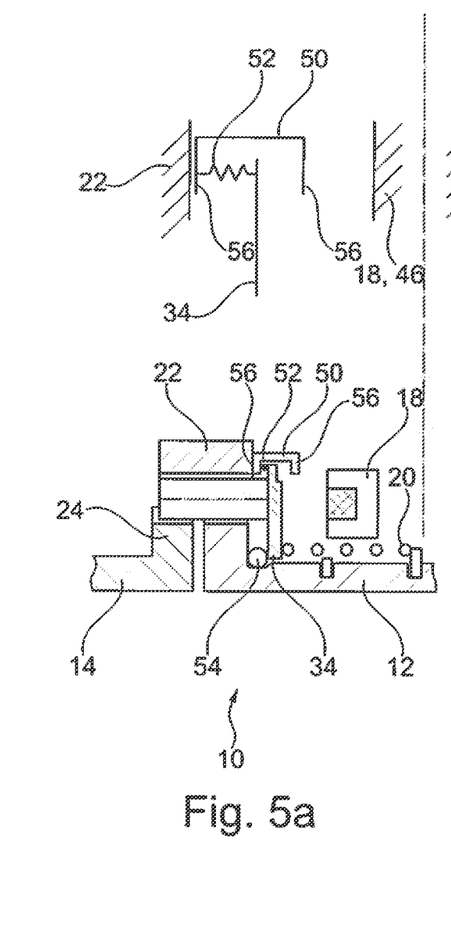
FIGS. 5a to 5d graphically illustrate the shifting process in a clutch arrangement in accordance with the present disclosure having an impulse element during various phases.
Figure 5B:
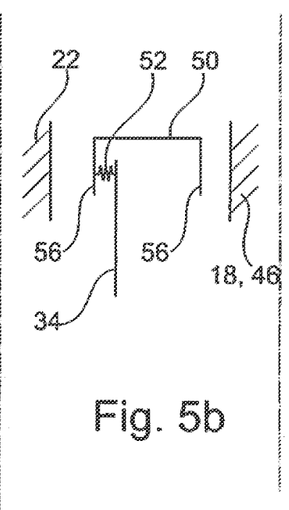
Figures 5C, 5D:
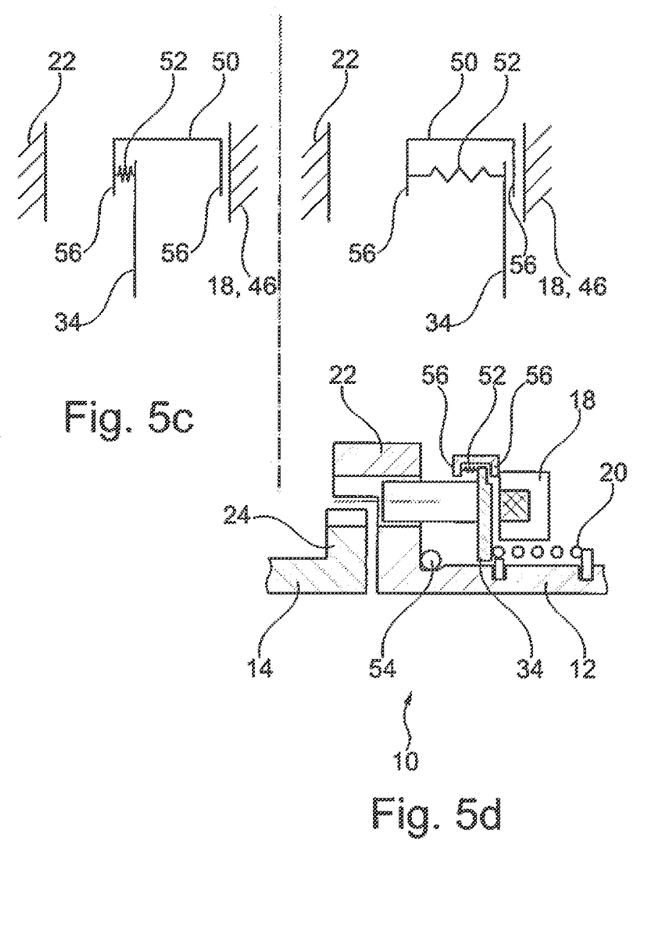

As can be seen from the two lower illustrations in FIG. 5a and FIG. 5d, it is envisaged in accordance with another embodiment that the shifting disc 34 has an impulse element 50, which can be moved in an axial direction and which can be a ring element, preferably with a substantially C- or U-shaped cross section, the flanges 56 of which flank the shifting disc 34 on both sides along the outer circumferential edge thereof. In this case, the impulse element 50 is preloaded in the same direction as the shift elements 16 by means of a plurality of springs 52 supported on the shifting disc 34, wherein the spring stiffness of said springs 52 should be selected in such a way that the total stiffness thereof is less than that of the spring 20 which acts on the shift elements 16.

By means of such coordination of the spring stiffnesses, it is possible to ensure that, at the start of energization of the electromagnet 18, in accordance with the transition from FIG. 5a to FIG. 5b, the magnetic force initially displaces only the impulse element 50, which initially rests on the left-hand stop in the form of the first shaft flange 22 in the initial state in FIG. 5a, in the direction of the electromagnet 18, which is indicated by the right-hand stop in the upper illustrations in FIG. 5, as a result of which energy is stored in the springs 52 between the impulse element 50 and the shifting disc 34. When the impulse element 50 then continues its movement in the direction of the electromagnet 18 and, in the process, in accordance with the transition from FIG. 5b to FIG. 5c, takes along the shifting disc 34 and, via the latter, the shift elements 16 by virtue of the fact that the axial freedom of motion of the shifting disc 34 is greater than that of the impulse element 50, the overcoming of the static friction of the shift elements 16 is then followed by the release of the energy previously stored in the springs 52 in that the springs 52 expand and, in the process, displace the shifting disc 34 together with the shift elements 16 carried thereby in the direction of the electromagnet 18 in accordance with the transition from FIG. 5c to FIG. 5d. Considered dynamically, the impulse element 50 releases its kinetic energy in the form of an impulse to the shifting disc 34 in that the kinetic energy of the impulse element 50 is stored temporarily in the form of potential energy in the springs 52, which is then transferred to the shifting disc 34 due to expansion of the springs 52. In this way, the static friction of the shift elements 16 owing to residual torques still being transmitted via the clutch arrangement 10 can be overcome without the need for a correspondingly strong and therefore large electromagnet for this purpose.

Figure 6:
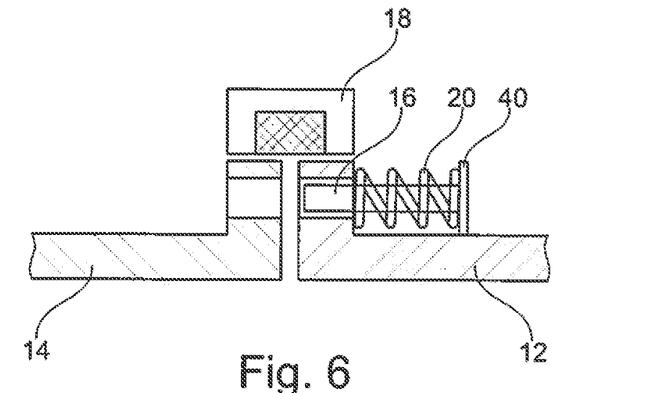
FIGS. 6 to 8 are schematic depictions intended to illustrate further illustrative embodiments constructed in accordance with the teachings of the present disclosure.

Although all the above description relates to embodiments in which the spring preloads the shift elements in the direction of the engaged position thereof and the electromagnet serves to disengage the shift elements into the disengaged position thereof, the invention is not restricted thereto. On the contrary, the concept in accordance with the invention can equally well be applied to embodiments in which, as illustrated in FIG. 6, the spring 20 preloads the shift elements 16 into the disengaged position thereof, whereas the electromagnet 18 serves to move the shift elements 16 into the engaged position thereof, meaning that this is a "normally open" clutch arrangement.

Figure 7:
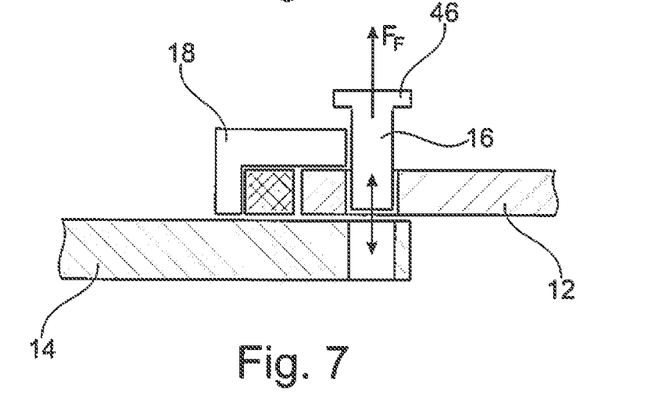
Figure 8:
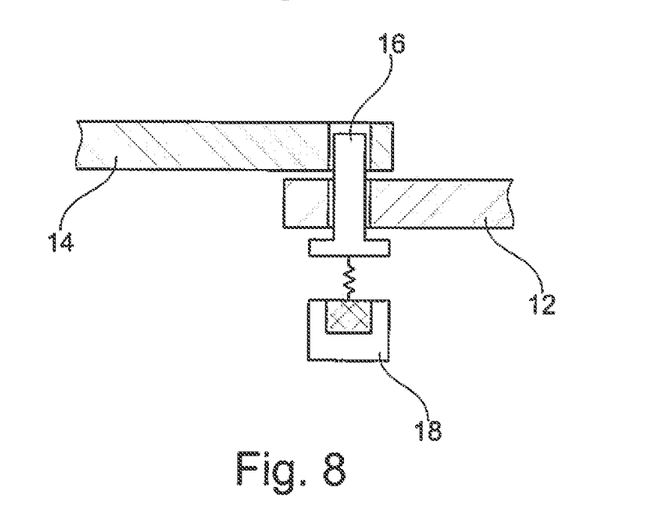

Moreover, it should be recognized that the invention is not restricted to axial shift element arrangements in accordance with the above explanations but that the concept according to the invention can equally well be applied to radial shift element arrangements in accordance with FIGS. 7 and 8, wherein, in accordance with FIG. 7, the shift elements are preloaded outwards in a radial direction in the direction of the disengaged position thereof by means of a spring force $F_F$, whereas the electromagnet 18 serves to transfer the shift elements 16 radially inwards into the engaged position thereof. On the other hand, in the embodiment illustrated in FIG. 8, the individual shift elements 16 are preloaded radially inwards in the direction of the engaged position thereof with the aid of springs, whereas the electromagnet 18 illustrated serves to transfer the shift elements 16 radially outwards into the disengaged position thereof.

It is thus possible with the concept in accordance with the invention to implement both "normally closed" and "normally open" clutch arrangements, more specifically both in a radial and in an axial shift element arrangement.

The clutch arrangement in accordance with the invention can be used in vehicle architectures in which the drive train side with shaft 12 comes to a halt. In this case, the stop 46 is eliminated, e.g. in FIG. 4, and, instead, the shifting disc 34 is pressed onto the magnet directly or indirectly, e.g. by means of a friction element, and thus actively braked. It is thereby possible to achieve co-rotation of the cardan shaft in the open state. Moreover, the air gap of the magnet is minimal, thereby allowing a further reduction in the holding current.

In another embodiment, a locking system can be integrated, thereby allowing the magnet to be deenergized in both shifting end positions.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

LIST OF REFERENCE SIGNS 10 clutch arrangement
12 first shaft section
14 second shaft section
16 shift element
18 electromagnet
20 spring
22 first shaft flange
24 second shaft flange
26 through-holes/bores
28 semicircular recesses
30 semicircular recesses
32 annular section
33 cylindrical section
34 shifting disc
36 first retaining ring
38 first annular groove
40 flange
42 stepped bore
44 widened section of 42
46 second retaining ring
48 annular groove
50 impulse element
52 springs
54 damping element
56 flanges of 50
D transverse compressive stress
R axis of rotation

What is claimed is:

1. A clutch arrangement, for a drive train of a motor vehicle, for coupling a first clutch section to a second clutch section, comprising:
    at least one pin-shaped shift element which is mounted so as to be movable in a direction of a longitudinal axis thereof between an engaged position, in which the two clutch sections are coupled for conjoint rotation by means of the shift element, and a disengaged position, in which the two clutch sections are decoupled from one another;
    at least one spring which acts at least indirectly on the shift element and preloads the shift element in a direction of the engaged or disengaged position;
    an electromagnet in an energized state which moves the shift element counter to a preloading effect of the spring; and
    a movable shifting device which carries a plurality of the shift elements and is arranged on the first clutch section, wherein the spring acts indirectly via the shifting device or directly on the shift elements in order to preload the shift elements in the direction of the engaged or disengaged position thereof;
    wherein the shift elements are fastened on the shifting device with play perpendicularly to a longitudinal axis of the shift elements.

2. The clutch arrangement in accordance with claim 1, wherein the electromagnet exerts a magnetic attraction directly on the shift element or indirectly on the shift element via the shifting device in the energized state in order to move the shift element counter to the preloading effect of the spring.

3. The clutch arrangement in accordance with claim 1, wherein the shifting device comprises an axially movable shifting disc, and wherein the shift elements extend axially from the shifting disc.

4. The clutch arrangement in accordance with claim 1, wherein each of the shift elements has a flange, wherein the flange includes a collar surrounding a distal end of the shift element, wherein the flange is received by a stepped bore formed in the shifting device and from which the shift element extends through the shifting device in the direction of the other end of the shift element, and wherein the flange of the shift element is received with play by the stepped bore.

5. The clutch arrangement in accordance with claim 4, wherein the spring acts directly on the flanges of the shift elements in order to preload them.

6. The clutch arrangement in accordance with claim 1, wherein the shifting element further comprises an impulse element axially movable relative to the shifting device and relative to the electromagnet, wherein the impulse element is preloaded in a direction away from the electromagnet by means of at least one further spring which is supported on the shifting device, and wherein a preloading effect of the at least one further spring is less than the preloading effect of the spring which acts on the shift elements.

7. The clutch arrangement in accordance with claim 6, wherein the impulse element has a ring element which surrounds an outer circumference of the shifting device and flanks the shifting device on both sides along an edge thereof.

8. The clutch arrangement in accordance with claim 6, wherein an axial freedom of motion of the shifting device is greater than an axial freedom of motion of the impulse element.

9. The clutch arrangement in accordance with claim 6, wherein the impulse element is movable in an axial direction relative to the shifting device and relative to the electromagnet.

10. The clutch arrangement in accordance with claim 1, wherein the first clutch section has a first shaft flange and the second clutch section has a second shaft flange which lies opposite the first shaft flange with a spacing in an axial direction, wherein the first shaft flange has a first multiplicity of through-holes, in each of which one of the shift elements is mounted in an axially movable manner, irrespective of its position, and wherein the second shaft flange has a second multiplicity of pockets into which the shift elements engage positively in the engaged position thereof in such a way that the first and second clutch sections are coupled to one another for conjoint rotation.

11. The clutch arrangement in accordance with claim 10, wherein the first shaft flange includes an annular section in a direction of the second shaft flange, wherein the pockets in the second shaft flange are designed as substantially semicircular recesses in an outer circumferential edge of the second shaft flange, whereas the through-holes in the first shaft flange include substantially semicircular recesses in an inner circumferential edge of the annular section of the first shaft flange in order to create substantially circular pockets for the shift elements together with the semicircular recesses in the outer circumferential edge of the second shaft flange.

12. The clutch arrangement in accordance with claim 10 wherein the first shaft flange includes a cylindrical section in a direction of the second shaft flange, wherein the pockets in the second shaft flange are designed as substantially semicircular recesses in an inner circumferential edge of the second shaft flange, whereas the through-holes in the first shaft flange include substantially semicircular recesses in an outer circumferential edge of the cylindrical section of the first shaft flange in order to create substantially circular pockets for the shift elements together with the semicircular recesses in the inner circumferential edge of the second shaft flange.

13. The clutch arrangement in accordance with claim 10, wherein a number of the second multiplicity is an integral multiple of the number of the first multiplicity.

14. The clutch arrangement in accordance with claim 1, further including a locking system for allowing the electromagnet to be de-energized when the shift element is located in either of its engaged and disengaged positions.

15. A clutch arrangement, for a drive train of a motor vehicle, for coupling a first clutch section to a second clutch section, comprising:
at least one pin-shaped shift element which is mounted so as to be movable in a direction of a longitudinal axis thereof between an engaged position, in which the two clutch sections are coupled for conjoint rotation by means of the shift element, and a disengaged position, in which the two clutch sections are decoupled from one another;
at least one spring which acts at least indirectly on the shift element and preloads the shift element in a direction of the engaged or disengaged position; and
an electromagnet in an energized state which moves the shift element counter to a preloading effect of the spring; and
a movable shifting device which carries a plurality of the shift elements and is arranged on the first clutch section, wherein the spring acts indirectly via the shifting device or directly on the shift elements in order to preload the shift elements in the direction of the engaged or disengaged position thereof;
wherein the shifting element further comprises an impulse element axially movable relative to the shifting device and relative to the electromagnet, wherein the impulse element is preloaded in a direction away from the electromagnet by means of at least one further spring which is supported on the shifting device, and wherein a preloading effect of the at least one further spring is less than the preloading effect of the spring which acts on the shift elements.

16. A clutch arrangement, for a drive train of a motor vehicle, for coupling a first clutch section to a second clutch section, comprising:
at least one pin-shaped shift element which is mounted so as to be movable in a direction of a longitudinal axis thereof between an engaged position, in which the two clutch sections are coupled for conjoint rotation by means of the shift element, and a disengaged position, in which the two clutch sections are decoupled from one another;
at least one spring which acts at least indirectly on the shift element and preloads the shift element in a direction of the engaged or disengaged position; and
an electromagnet in an energized state which moves the shift element counter to a preloading effect of the spring; and
a movable shifting device which carries a plurality of the shift elements and is arranged on the first clutch section, wherein the spring acts indirectly via the shifting device or directly on the shift elements in order to preload the shift elements in the direction of the engaged or disengaged position thereof;

wherein each of the shift elements has a flange, wherein the flange includes a collar surrounding a distal end of the shift element, wherein the flange is received by a stepped bore formed in the shifting device and from which the shift element extends through the shifting device in the direction of the other end of the shift element, and wherein the flange of the shift element is received with play by the stepped bore.

* * * * *